United States Patent
Huang et al.

(10) Patent No.: US 12,387,372 B2
(45) Date of Patent: Aug. 12, 2025

(54) TRACKING ACCURACY EVALUATING SYSTEM, TRACKING ACCURACY EVALUATING DEVICE, AND TRACKING ACCURACY EVALUATING METHOD

(71) Applicant: HTC Corporation, Taoyuan (TW)

(72) Inventors: Chao Shuan Huang, Taoyuan (TW); Hao-Yun Chao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 20 days.

(21) Appl. No.: 18/637,464

(22) Filed: Apr. 17, 2024

(65) Prior Publication Data

US 2025/0054185 A1    Feb. 13, 2025

Related U.S. Application Data (60) Provisional application No. 63/531,012, filed on Aug. 7, 2023.

(51) Int. Cl.
| | |
|---|---|
| *H04W 4/02* | (2018.01) |
| *G01C 22/00* | (2006.01) |
| *G06T 7/536* | (2017.01) |
| *G06T 7/579* | (2017.01) |
| *G06T 7/73* | (2017.01) |

(52) U.S. Cl.
CPC ............ *G06T 7/74* (2017.01); *G06T 7/536* (2017.01); *G06T 7/579* (2017.01)

(58) Field of Classification Search
CPC .......... G06T 7/74; G06T 7/536; G06T 7/579; G06T 2207/30208; G06T 7/246
See application file for complete search history.

(56) References Cited

U.S. PATENT DOCUMENTS

| | | | |
|---|---|---|---|
| 11,481,923 B2* | 10/2022 | Lin | ........................... G06T 7/74 |
| 11,625,855 B2* | 4/2023 | Kim | ........................ G06F 16/29 |
| | | | 382/103 |

(Continued)

FOREIGN PATENT DOCUMENTS

TW            201915513          4/2019

OTHER PUBLICATIONS

"Office Action of Taiwan Counterpart Application", issued on Mar. 4, 2025, p. 1-p. 6.

*Primary Examiner* — Howard D Brown, Jr.
(74) *Attorney, Agent, or Firm* — JCIPRNET (57) ABSTRACT

The embodiments of the disclosure provide a tracking accuracy evaluating system, a tracking accuracy evaluating device, and a tracking accuracy evaluating method. The method includes: detecting multiple distances between the tracking accuracy evaluating device and multiple reference positions in a rotating process associated with a rotating axis, wherein an accommodating space of the tracking accuracy evaluating device accommodates a tracking device during the rotating process, and the distance sensor, the rotating axis, and the tracking device accommodated in the accommodating space have a fixed relative position therebetween; estimating a first pose variation of the tracking device during the rotating process based on the distances and the fixed relative position; obtaining a second pose variation of the tracking device during the rotating process; and determining a tracking accuracy of the tracking device based on the first pose variation and the second pose variation.

15 Claims, 6 Drawing Sheets

(56) References Cited

U.S. PATENT DOCUMENTS

| | | | |
|---|---|---|---|
| 2013/0148851 A1* | 6/2013 | Leung | G06T 7/74 |
| | | | 382/103 |
| 2014/0147000 A1* | 5/2014 | Wu | G06T 7/277 |
| | | | 382/103 |
| 2017/0230633 A1* | 8/2017 | Doh | G06T 7/579 |
| 2017/0337701 A1* | 11/2017 | Jovanovich | G06T 7/97 |
| 2019/0028848 A1* | 1/2019 | Elias | G01C 22/006 |
| 2022/0391026 A1* | 12/2022 | Wu | G06T 7/579 |
| 2024/0203069 A1* | 6/2024 | Kim | G06F 3/0346 |
| 2025/0054185 A1* | 2/2025 | Huang | G06T 7/246 |

* cited by examiner

TRACKING ACCURACY EVALUATING SYSTEM, TRACKING ACCURACY EVALUATING DEVICE, AND TRACKING ACCURACY EVALUATING METHOD

CROSS-REFERENCE TO RELATED APPLICATION

This application claims the priority benefit of U.S. provisional application Ser. No. 63/531,012, filed on Aug. 7, 2023. The entirety of the above-mentioned patent application is hereby incorporated by reference herein and made a part of this specification.

BACKGROUND

1. Field of the Invention

The present disclosure generally relates to a mechanism for evaluating tracking performance, in particular, to a tracking accuracy evaluating system, a tracking accuracy evaluating device, and a tracking accuracy evaluating method.

2. Description of Related Art

Advanced visual-inertial tracking systems have attained sub-millimeter and sub-degree levels of accuracy and precision, surpassing the capabilities of traditional mechanical devices (e.g., vernier scales) and approaches for measurement.

One proposed solution involves employing another high-performance tracking system as a reference point or ground truth. However, such systems are costly and challenging to set up.

SUMMARY OF THE INVENTION

Accordingly, the disclosure is directed to a tracking accuracy evaluating system, a tracking accuracy evaluating device, and a tracking accuracy evaluating method, which may be used to solve the above technical problems.

The embodiments of the disclosure provide a tracking accuracy evaluating system including a tracking accuracy evaluating device and a processing device. The tracking accuracy evaluating device includes a body, an accommodating space, and a distance sensor. The body has a rotating axis. The accommodating space is disposed on the body and configured to accommodate a tracking device. The distance sensor is disposed on the body and configured to perform: detecting a plurality of distances between the tracking accuracy evaluating device and a plurality of reference positions in a rotating process associated with the rotating axis, wherein the accommodating space accommodates the tracking device during the rotating process, and the distance sensor, the rotating axis, and the tracking device accommodated in the accommodating space have a fixed relative position therebetween. The processing device is coupled to the distance sensor and the tracking device and configured to perform: estimating a first pose variation of the tracking device during the rotating process based on the plurality of distances and the fixed relative position; obtaining a second pose variation of the tracking device during the rotating process; and determining a tracking accuracy of the tracking device based on the first pose variation and the second pose variation.

The embodiments of the disclosure provide a tracking accuracy evaluating device including a body, an accommodating space, and a distance sensor. The body has a rotating axis. The accommodating space is disposed on the body and configured to accommodate a tracking device. The distance sensor is disposed on the body and configured to perform: detecting a plurality of distances between the tracking accuracy evaluating device and a plurality of reference positions in a rotating process associated with the rotating axis, wherein the accommodating space accommodates the tracking device during the rotating process, and the distance sensor, the rotating axis, and the tracking device accommodated in the accommodating space have a fixed relative position therebetween.

The embodiments of the disclosure provide a tracking accuracy evaluating method, including: detecting, by a distance sensor of a tracking accuracy evaluating device, a plurality of distances between the tracking accuracy evaluating device and a plurality of reference positions in a rotating process associated with a rotating axis of the tracking accuracy evaluating device, wherein an accommodating space of the tracking accuracy evaluating device accommodates a tracking device during the rotating process, and the distance sensor, the rotating axis, and the tracking device accommodated in the accommodating space have a fixed relative position therebetween; estimating, by a processing device, a first pose variation of the tracking device during the rotating process based on the plurality of distances and the fixed relative position; obtaining, by the processing device, a second pose variation of the tracking device during the rotating process; and determining, by the processing device, a tracking accuracy of the tracking device based on the first pose variation and the second pose variation.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
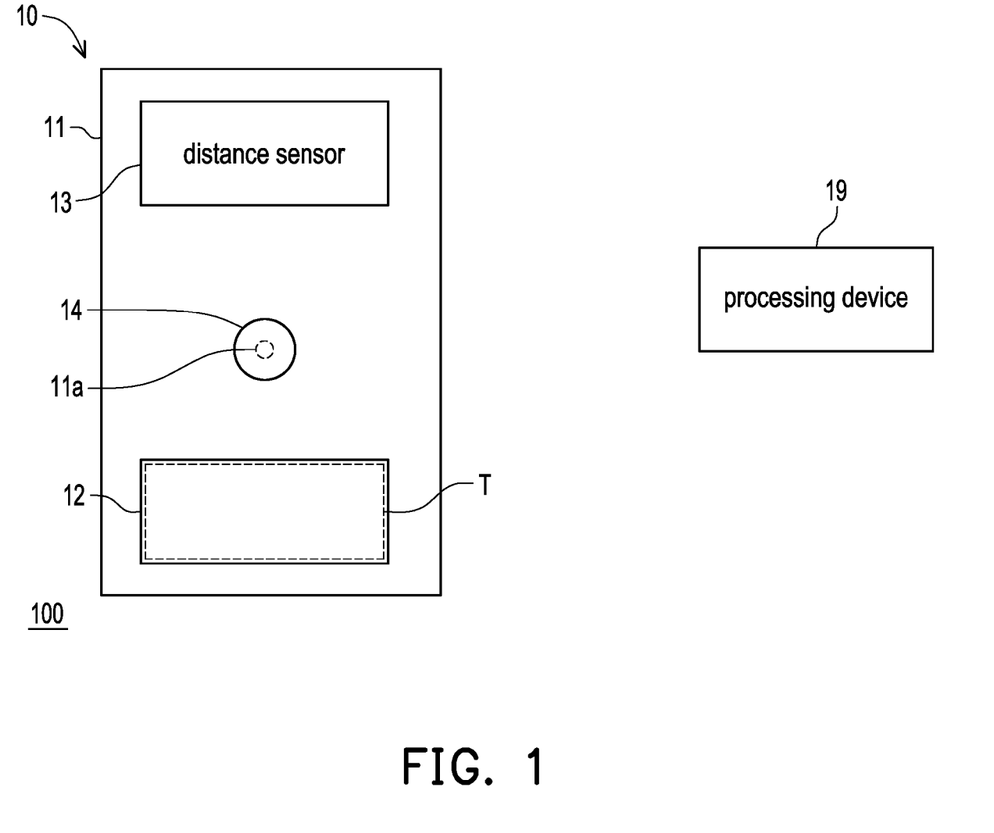
FIG. 1 shows a schematic diagram of a tracking accuracy evaluating system according to an embodiment of the disclosure.

See FIG. 1, which shows a schematic diagram of a tracking accuracy evaluating system according to an embodiment of the disclosure. In FIG. 1, the tracking accuracy evaluating system 100 includes a tracking accuracy evaluating device 10 and a processing device 19. In various embodiments, the processing device 19 may be coupled to the distance sensor 13 and may be a computer device and/or a smart device, but the disclosure is not limited thereto.

In some embodiments, the processing device 19 may also be disposed in the tracking accuracy evaluating device 10. For example, the processing device 19 may be a processor of the tracking accuracy evaluating device 10, wherein the processor may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In FIG. 1, the tracking accuracy evaluating device 10 includes a body 11, an accommodating space 12, and a distance sensor 13. The body 11 is designed with a rotating axis 11a. In some embodiments, the tracking accuracy evaluating device 10 can further include a rotating shaft 14 disposed at the position corresponding to the rotating axis 11a. In this case, the body 11 of the tracking accuracy evaluating device 10 can be pivotally rotated based on the rotating axis 11a when the rotating shaft 14 is (manually) rotated.

In other embodiments, the body 11 of the tracking accuracy evaluating device 10 can be also pivotally rotated based on the rotating axis 11a in other ways. For example, the body 11 can be disposed with a through hole at the position corresponding to the rotating axis 11a. In this case, the body 11 can be placed onto a rotary plate, wherein the rotary plate may have a rotating shaft fitting the through hole and corresponding to the rotating axis 11a, such that the body 11 can be rotated when the rotary place rotates based on the rotating axis 11a, but the disclosure is not limited thereto.

The accommodating space 12 is disposed on the body 11 and configured to accommodate a tracking device T. In various embodiments, the tracking device T may be any device whose tracking accuracy is to be tested/evaluated. For example, the tracking device T may be a head-mounted display (HMD), a wearable device, a smart device, or the like.

In the embodiments of the disclosure, the tracking device T may track its own pose based on, for example, inside-out tracking mechanisms, the motion data (e.g., inertial measurement unit (IMU) data) detected by the motion detection circuit (e.g., IMU) therein, etc.

In some embodiments, the contour of the accommodating space 12 may correspond to the contour of the tracking device T. In some embodiments, the shape/size of the accommodating space 12 may be designed to tightly/properly accommodate the tracking device T.

In some embodiments, the accommodating space 12 may be designed with clamps/magnetic portions to tightly grab/attract the tracking device T when accommodating the tracking device T. In other embodiments, the accommodating space 12 may be designed with limiting portions for (tightly) limiting the tracking device T at a particular position within the accommodating space 12 when accommodating the tracking device T, but the disclosure is not limited thereto.

In some embodiments, the distance sensor 13 may be disposed on the body 11 and used to detect the distance between (the body 11 of) the tracking accuracy evaluating device 10 and other external objects. In various embodiments, the distance sensor 13 may include one or more of a laser rangefinder, a time-of-flight (ToF) sensor, a camera, or the like, but the disclosure is not limited thereto.

In the embodiments of the disclosure, the distance sensor 13, the rotating axis 11a, and the tracking device T accommodated in the accommodating space 12 have a fixed relative position therebetween. That is, when the tracking device T is accommodated in the accommodating space 12, the relative position between the distance sensor 13, the rotating axis 11a, and the tracking device T would be fixed no matter how the tracking accuracy evaluating device 10 is moved (e.g., rotated).

In some embodiments, the fixed relative position between the distance sensor 13, the rotating axis 11a, and the tracking device T accommodated in the accommodating space 12 may be characterized by one or more corresponding extrinsic parameters, but the disclosure is not limited thereto.

In the embodiments of the disclosure, the distance sensor 13 may be configured to detect a plurality of distances between the tracking accuracy evaluating device 10 and a plurality of reference positions in a rotating process associated with the rotating axis 11a, wherein the accommodating space 12 accommodates the tracking device T during the rotating process.

Figure 2:
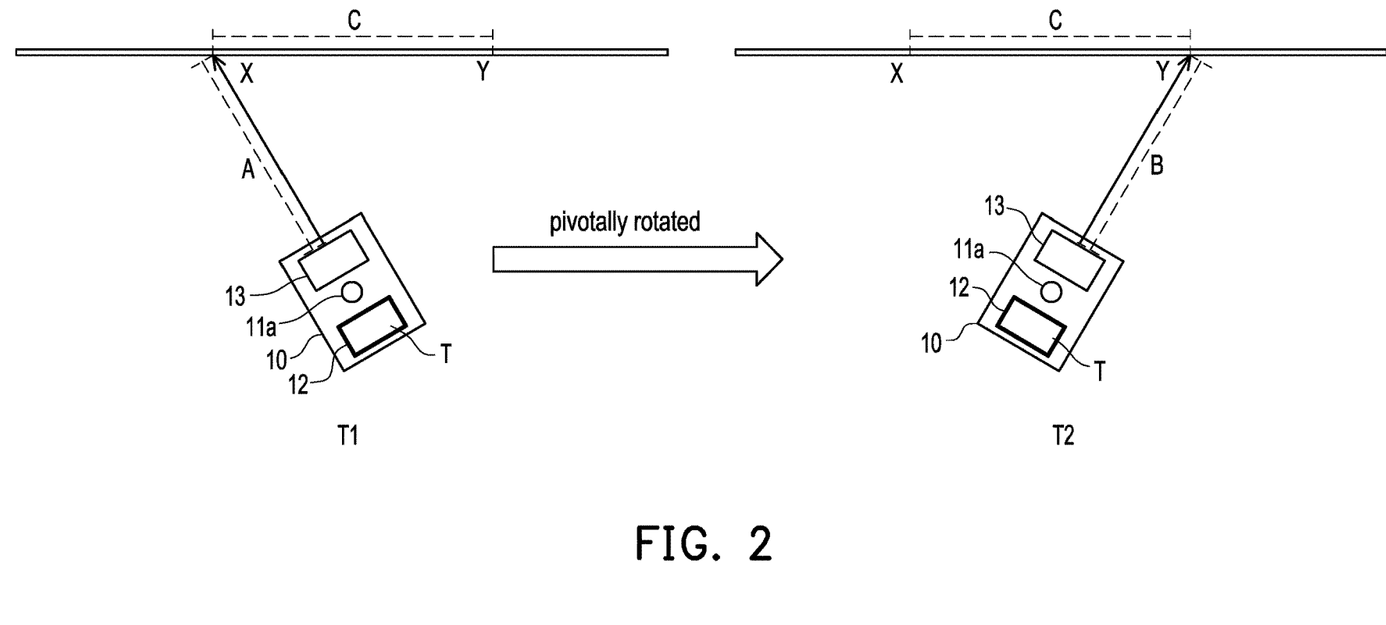
FIG. 2 shows an application scenario according to an embodiment of the disclosure.

For better understanding, FIG. 2 would be used as an example, wherein FIG. 2 shows an application scenario according to an embodiment of the disclosure.

In FIG. 2, the considered rotating process may occur within a duration between a first timing point T1 and a second timing point T2. In other embodiments, the considered rotating process may occur within another duration that covers the duration between the first timing point T1 and the second timing point T2, but the disclosure is not limited thereto.

In one embodiment, the distance sensor 13 (e.g., a laser rangefinder) may detect, at the first timing point T1 of the rotating process, a first distance A between the tracking accuracy evaluating device 10 and a first reference position X among the plurality of reference positions.

In the scenario of FIG. 2, the tracking accuracy evaluating device 10 may be pivotally rotated based on the rotating axis 11a from the status at the first timing point T1 to the status at the second timing point T2. For example, a user may manually rotate the tracking accuracy evaluating device 10 based on the rotating axis 11a by rotating the rotating shaft 14, such that the tracking accuracy evaluating device 10 may in clockwise as shown in FIG. 2, but the disclosure is not limited thereto.

In this case, the distance sensor 13 may detect, at the second timing point T2 of the rotating process, a second distance B between the tracking accuracy evaluating device 10 and a second reference position Y among the plurality of reference positions.

In one embodiment, the plurality of reference positions may be predetermined. For example, the first reference position X and the second reference position Y among the reference positions may be two predetermined positions, and the two predetermined position may be designed to be on the same particular plane (e.g., a wall) or on different places, but the disclosure is not limited thereto.

In the embodiments where the plurality of reference positions are predetermined, a third distance C between the first reference position X and the second reference position Y may be regarded as known. For example, once the first reference position X and the second reference position Y have been determined, the third distance C may be (manually) measured in advance, but the disclosure is not limited thereto.

In some embodiments, the plurality of reference positions may also be not predetermined. For example, when the distance sensor 13 is facing a first position and detect the distance between this first position and the tracking accuracy evaluating device 10, this first position may be regarded as the first reference position X, and the associated distance and the timing point where the distance detection is performed may be respectively regarded as the first distance A and the first timing point T1. Likewise, when the distance sensor 13 is facing a second position and detect the distance between this second position and the tracking accuracy evaluating device 10, this second position may be regarded as the second reference position Y, and the associated distance and the timing point where the distance detection is performed may be respectively regarded as the second distance B and the second timing point T2, but the disclosure is not limited thereto.

In the embodiments where the plurality of reference positions are not predetermined, the third distance C between the first reference position X and the second reference position Y may be (manually) measured afterwards, but the disclosure is not limited thereto.

From another perspective, the first timing point T1 is a timing point where the distance sensor 13 faces the first reference position X, the second timing point T2 is a timing point where the distance sensor 13 faces the second reference position Y, and the distance sensor 13 is rotated from facing the first reference position X to face the second reference position Y during the rotating process.

In the embodiments of the disclosure, the detected distances may be provided to the processing device 19 for further analysis, such as the evaluation of the tracking accuracy of the tracking device T.

In the embodiments of the disclosure, the processing device 19 may be configured to estimate a first pose variation of the tracking device T during the rotating process based on the plurality of distances (e.g., the first distance A and the second distance B) and the fixed relative position between the distance sensor 13, the rotating axis 11a, and the tracking device T accommodated in the accommodating space 12.

Figure 3:
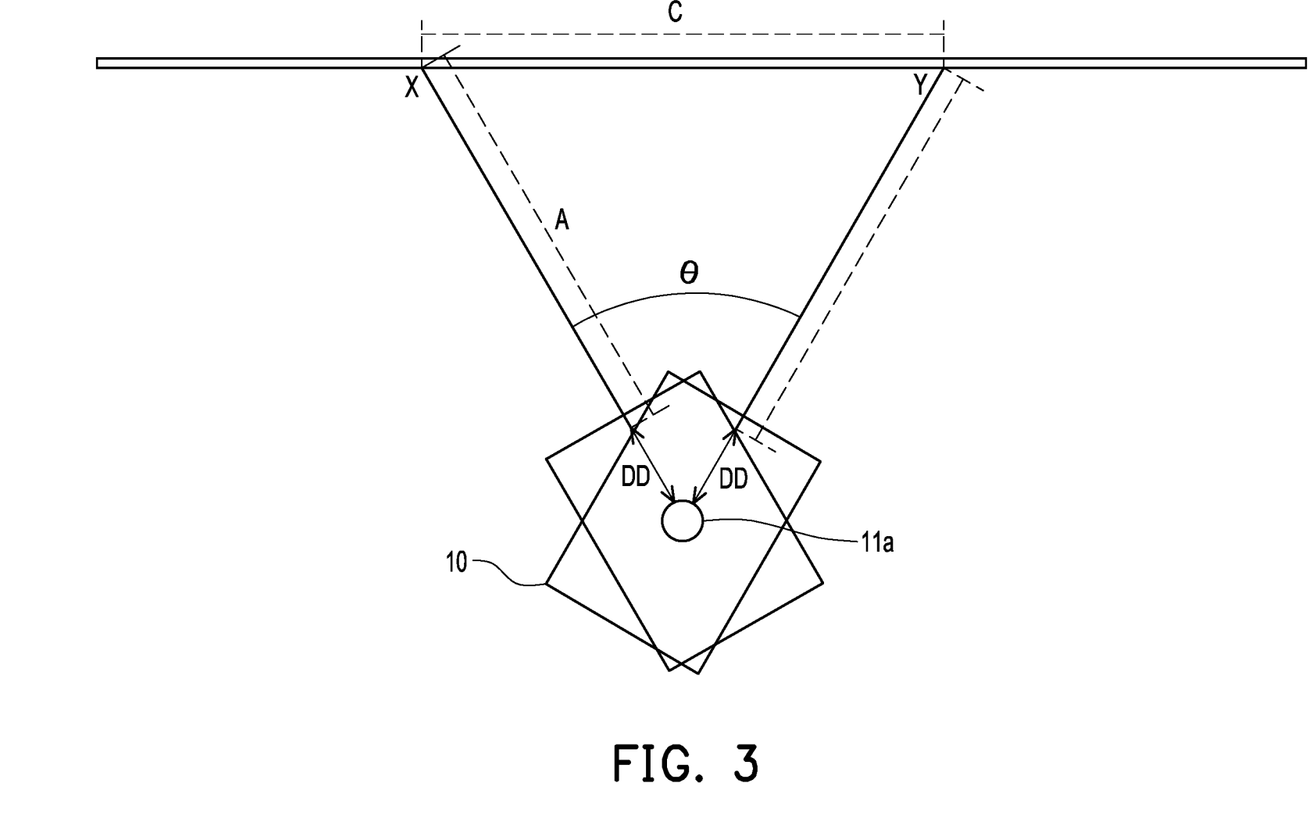
FIG. 3 shows a schematic diagram of determining the first pose variation of the tracking device according to FIG. 2.

See FIG. 3, which shows a schematic diagram of determining the first pose variation of the tracking device according to FIG. 2.

In the embodiment, the processing device 19 may receive the first distance A and the second distance B from the distance sensor 13.

In addition, the processing device 19 may obtain the third distance C between the first reference position X and the second reference position Y. In the embodiments where the reference positions are predetermined, the third distance C may be (manually) measured in advance and stored in, for example, some storage space accessible to the processing device 19. In the embodiments where the reference positions are not predetermined, the third distance C may be (manually) measured after the reference positions are determined and stored in, for example, some storage space accessible to the processing device 19. In these cases, the processing device 19 may access the storage space to obtain the third distance C.

In other embodiments, the third distance C may also be manually inputted to the processing device 19, but the disclosure is not limited thereto.

Afterwards, the processing device 19 may derive a rotating angle $\theta$ of the body 11 of the tracking accuracy evaluating device 10 during the rotating process based on the first distance A, the second distance B, and the third distance C.

As can be seen from FIG. 3, the first reference position X, the second reference position Y, and the body 11 (specifically, the rotating axis 11a) of the tracking accuracy evaluating device 10 can be regarded as forming a triangle. In this case, the processing device 19 may derive the rotating angle $\theta$ by using the associated geometry theorems (e.g., the cosine rule) based on the first distance A, second distance B, the third distance C, and the distance DD between the distance sensor 13 and the rotating axis 11a. In the embodiment, since the relative position between the distance sensor 13 and the rotating axis 11a is fixed, the distance DD can be regarded as known. In this case, the lengths of the three sides of the triangle formed by the first reference position X, the second reference position Y, and the rotating axis 11 are known, and hence the rotating angle $\theta$ can be derived by using the associated geometry theorems.

Next, the processing device 19 may determine the first pose variation based on the rotating angle $\theta$ and the fixed relative position.

In the embodiments of the disclosure, the first pose variation may be characterized by a first rotation and a first translation of the tracking device T during the rotating process.

That is, once the rotating angle $\theta$ has been determined, the processing device 19 may determine the first rotation and the first translation of the tracking device T during the rotating process based on the rotating angle $\theta$ and the fixed relative position (e.g., the distance DD) between the distance sensor 13, the rotating axis 11a, and the tracking device T accommodated in the accommodating space 12, but the disclosure is not limited thereto.

In addition, the processing device 19 may obtain a second pose variation of the tracking device T during the rotating process. In the embodiment, the second pose variation may be determined based on the pose tracking results detected by the tracking device T during the rotating process.

For example, the tracking device T may detect a first pose at the first timing point T1 and a second pose at the second timing point T2, and determine the pose difference therebetween to the processing device 19 as the second pose variation. In one embodiment, the tracking device T may send the second pose variation to the processing device 19.

In another embodiment, the tracking device T may also send the first pose detected at the first timing point T1 and the second pose detected at the second timing point T2 to the processing device 19, and the processing device 19 may accordingly determine the pose difference therebetween as the second pose variation.

In yet another embodiment, the tracking device T may provide a plurality of poses to the processing device 19, and the processing device 19 may determine the poses respectively corresponding to the first timing point T1 and the second timing point T2 as the first pose and the second pose. Next, the processing device 19 may determine the pose difference between the first pose and the second pose as the second pose variation, wherein the second pose variation may be characterized by a second rotation and a second translation of the tracking device T during the rotating process, but the disclosure is not limited thereto.

From another perspective, the first pose variation is an estimated pose variation determined by the processing device 19 based on the rotating angle θ and the fixed relative position (e.g., the distance DD) between the distance sensor 13, the rotating axis 11a, and the tracking device T accommodated in the accommodating space 12 during the rotating process.

On the other hand, the second pose variation is another pose variation determined based on the pose tracking results detected by the tracking device T during the rotating process.

In this case, the first pose variation may be regarded as a ground truth for evaluating the tracking accuracy of the tracking device T.

In one embodiment, the processing device 19 may determine a tracking accuracy of the tracking device T based on the first pose variation and the second pose variation.

In one embodiment, the tracking accuracy may be characterized by an error between the first pose variation and the second pose variation. In the embodiments, the error is negatively related to the tracking accuracy of the tracking device T. That is, the lower the error is, the higher the tracking accuracy of the tracking device T, and vice versa.

In other embodiment, the tracking accuracy can also be characterized in other forms, such as a ratio between the first pose variation and the second pose variation, but the disclosure is not limited thereto.

In addition, the accuracy of the first pose variation may be positively expandable by increasing the first distance A, the second distance B, and the third distance C. That is, if the user intends to increase the accuracy of the estimated first pose variation, the user may simply increase one or more of the first distance A, the second distance B, and the third distance C by adjusting the positions of the first reference position X, the second reference position Y, and/or the position of the tracking accuracy evaluating device 10.

Figure 4A:
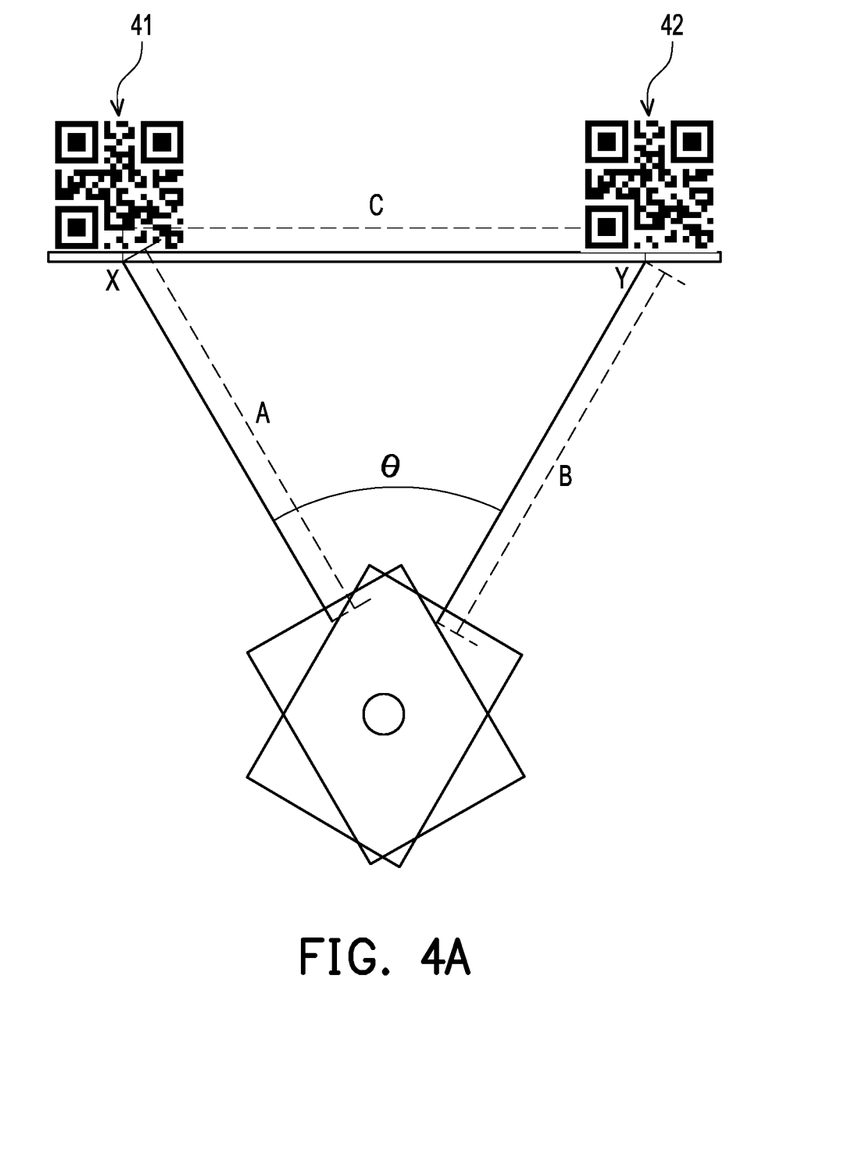
FIG. 4A shows a schematic diagram of detecting the distances according to an embodiment of the disclosure.
Figure 4B:
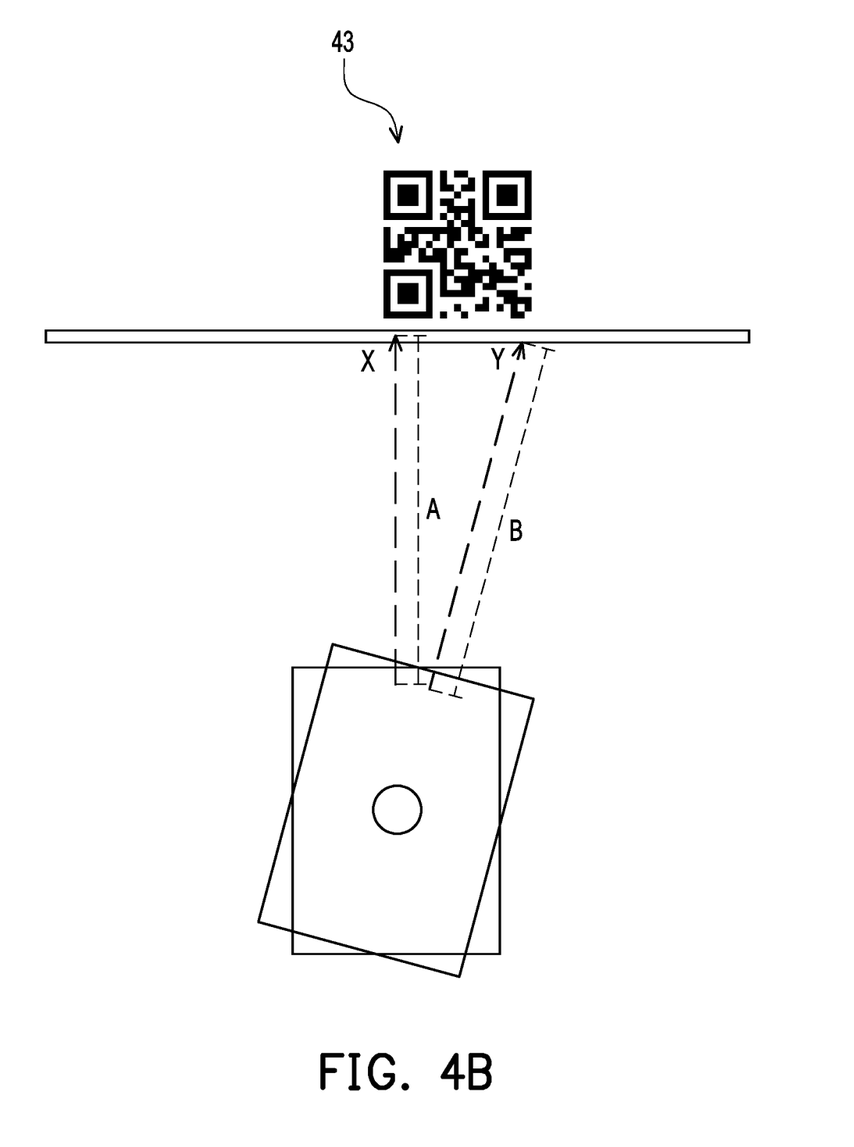
FIG. 4B shows a schematic diagram of detecting the distances according to another embodiment of the disclosure.

In some embodiments, the first distance A and the second distance B can also be detected by using other ways, which would be discussed along with FIG. 4A and FIG. 4B.

See FIG. 4A, which shows a schematic diagram of detecting the distances according to an embodiment of the disclosure.

In FIG. 4A, a first pattern 41 and a second pattern 42 (e.g., QR codes or other patterns recognizable to the distance sensor 13) may be disposed at the first reference position X and the second reference position Y, respectively. In this case, the distance sensor 13 (e.g., a camera) may capture, at the first timing point T1 of the rotating process, a first image of the first pattern 41 disposed at the first reference position X and accordingly determining the first distance A. For example, the first pattern 41 may be designed with a particular size, and the distance sensor 13 may derive the first distance A based on the ratio of the particular size of the first pattern 41 and the size of the first pattern 41 in the captured first image, but the disclosure is not limited thereto.

Likewise, the distance sensor 13 may capture, at the second timing point T2 of the rotating process, a second image of the second pattern 42 disposed at the second reference position Y and accordingly determining the second distance B. For example, the second pattern 42 may be designed with a particular size, and the distance sensor 13 may derive the second distance B based on the ratio of the particular size of the second pattern 42 and the size of the second pattern 42 in the captured second image, but the disclosure is not limited thereto.

See FIG. 4B, which shows a schematic diagram of detecting the distances according to another embodiment of the disclosure.

In FIG. 4B, a pattern 43 (e.g., a QR code or other pattern recognizable to the distance sensor 13) may be designed to have a range covering the first reference position X and the second reference position Y. In this case, the distance sensor 13 (e.g., a camera) may capture, at the first timing point T1 of the rotating process, a third image of the pattern 43 and accordingly determine the first distance A. For example, the pattern 43 may be designed with a particular size, and the distance sensor 13 may derive the first distance A based on the ratio of the particular size of the pattern 43 and the size of the pattern 43 in the captured third image, but the disclosure is not limited thereto.

In addition, the distance sensor 13 may capture, at the second timing point T2 of the rotating process, a fourth image of the pattern 43 and accordingly determine the second distance B. For example, since the pattern 43 would be captured with another viewing angle in the fourth image, the distance sensor 13 may derive the second distance B based on the difference between the pattern 43 captured in the third image and the pattern 43 captured in the fourth image, but the disclosure is not limited thereto.

Figure 5:
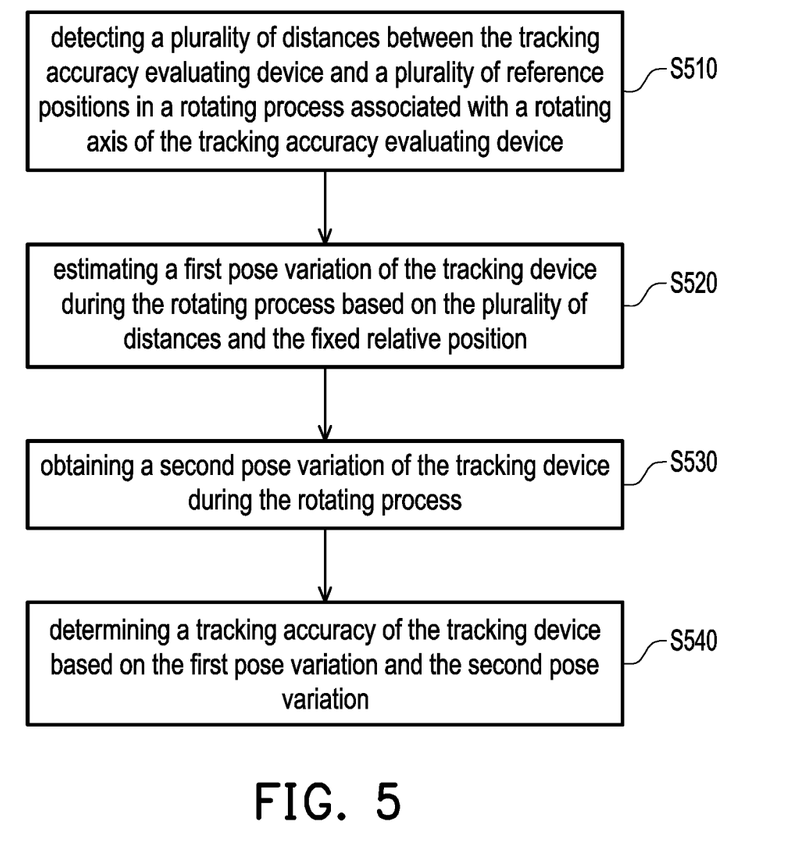
FIG. 5 shows a flow chart of the tracking accuracy evaluating method according to an embodiment of the disclosure.

See FIG. 5, which shows a flow chart of the tracking accuracy evaluating method according to an embodiment of the disclosure.

In step S510, the distance sensor 13 detects the plurality of distances between the tracking accuracy evaluating device 10 and the plurality of reference positions in the rotating process associated with the rotating axis 11a of the tracking accuracy evaluating device 10.

In step S520, the processing device 19 estimates the first pose variation of the tracking device T during the rotating process based on the plurality of distances and the fixed relative position.

In step S530, the processing device 19 obtains a second pose variation of the tracking device T during the rotating process.

In step S540, the processing device 19 determines the tracking accuracy of the tracking device T based on the first pose variation and the second pose variation.

Details of each step in FIG. 5 may be referred to the descriptions in the above, which would not be repeated herein.

In summary, the embodiments of the disclosure provide a novel solution to evaluate the tracking accuracy of the tracking device (e.g., an HMD) in a low-cost and effective way.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A tracking accuracy evaluating system, comprising:
a tracking accuracy evaluating device, comprising:
a body, having a rotating axis;
an accommodating space, disposed on the body and configured to accommodate a tracking device;
a distance sensor, disposed on the body and configured to perform:
detecting a plurality of distances between the tracking accuracy evaluating device and a plurality of reference positions in a rotating process associated with the rotating axis, wherein the accommodating space accommodates the tracking device during the rotating process, and the distance sensor, the rotating axis, and the tracking device accommodated in the accommodating space have a fixed relative position therebetween;
a processing device, coupled to the distance sensor and the tracking device and configured to perform:
estimating a first pose variation of the tracking device during the rotating process based on the plurality of distances and the fixed relative position;
obtaining a second pose variation of the tracking device during the rotating process; and
determining a tracking accuracy of the tracking device based on the first pose variation and the second pose variation.

2. The system according to claim 1, wherein the body of the tracking accuracy evaluating device is pivotally rotated based on the rotating axis during the rotating process.

3. The system according to claim 1, wherein the distance sensor is configured to perform:
detecting, at a first timing point of the rotating process, a first distance between the tracking accuracy evaluating device and a first reference position among the plurality of reference positions; and
detecting, at a second timing point of the rotating process, a second distance between the tracking accuracy evaluating device and a second reference position among the plurality of reference positions.

4. The system according to claim 3, wherein the processing device is configured to perform:
obtaining a third distance between the first reference position and the second reference position;
deriving a rotating angle of the body of the tracking accuracy evaluating device during the rotating process based on the first distance, the second distance, and the third distance; and
determining the first pose variation based on the rotating angle and the fixed relative position, wherein the first pose variation is characterized by a first rotation and a first translation of the tracking device during the rotating process.

5. The method according to claim 3, wherein the second pose variation is determined based on a first pose detected by the tracking device at the first timing point and a second pose detected by the tracking device at the second timing point, and the second pose variation is characterized by a second rotation and a second translation of the tracking device during the rotating process.

6. The system according to claim 3, wherein the first timing point is a timing point where the distance sensor faces the first reference position, the second timing point is a timing point where the distance sensor faces the second reference position, and the distance sensor is rotated from facing the first reference position to face the second reference position during the rotating process.

7. The system according to claim 3, wherein the distance sensor comprises a camera, and the distance sensor is configured to perform;
capturing, at the first timing point of the rotating process, a first image of a first pattern disposed at the first reference position and accordingly determining the first distance; and
capturing, at the second timing point of the rotating process, a second image of a second pattern disposed at the second reference position and accordingly determining the second distance.

8. The system according to claim 3, wherein the distance sensor comprises a camera, and the distance sensor is configured to perform;
capturing, at the first timing point of the rotating process, a third image of a pattern and accordingly determining the first distance; and
capturing, at the second timing point of the rotating process, a fourth image of the pattern and accordingly determining the second distance.

9. The system according to claim 1, wherein a contour of the accommodating space corresponds to a contour of the tracking device.

10. The system according to claim 1, wherein the tracking accuracy evaluating device further comprises a rotating shaft, and the rotating shaft is disposed on the body and corresponds to the rotating axis.

11. The system according to claim 1, wherein the processing device is disposed in the tracking accuracy evaluating device.

12. The system according to claim 1, wherein the plurality of reference positions are predetermined.

13. The system according to claim 1, wherein the tracking accuracy is characterized by an error between the first pose variation and the second pose variation.

14. A tracking accuracy evaluating device, comprising:
a body, having a rotating axis;
an accommodating space, disposed on the body and configured to accommodate a tracking device; and
a distance sensor, disposed on the body and configured to perform:
detecting a plurality of distances between the tracking accuracy evaluating device and a plurality of reference positions in a rotating process associated with the rotating axis, wherein the accommodating space accommodates the tracking device during the rotating process, and the distance sensor, the rotating axis, and the tracking device accommodated in the accommodating space have a fixed relative position therebetween.

15. A tracking accuracy evaluating method, comprising:
detecting, by a distance sensor of a tracking accuracy evaluating device, a plurality of distances between the tracking accuracy evaluating device and a plurality of reference positions in a rotating process associated with a rotating axis of the tracking accuracy evaluating device, wherein an accommodating space of the tracking accuracy evaluating device accommodates a tracking device during the rotating process, and the distance sensor, the rotating axis, and the tracking device accommodated in the accommodating space have a fixed relative position therebetween;
estimating, by a processing device, a first pose variation of the tracking device during the rotating process based on the plurality of distances and the fixed relative position;
obtaining, by the processing device, a second pose variation of the tracking device during the rotating process; and
determining, by the processing device, a tracking accuracy of the tracking device based on the first pose variation and the second pose variation.

* * * * *